(12) United States Patent
Nucci et al.

(10) Patent No.: US 10,601,956 B2
(45) Date of Patent: Mar. 24, 2020

(54) AUTOMATICALLY AND REMOTELY ON-BOARD SERVICES DELIVERY PLATFORM COMPUTING NODES

(71) Applicant: Cisco Technology, Inc., San Jose, CA (US)

(72) Inventors: Antonio Nucci, San Jose, CA (US); Ahmed Khattab, San Jose, CA (US); Carlos M. Pignataro, Cary, NC (US); Richard M. Plane, Wake Forest, NC (US); Duen-Uei D. Chen, San Jose, CA (US); Samudra H. Bekti, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/177,507

(22) Filed: Nov. 1, 2018

(65) Prior Publication Data
US 2019/0373083 A1 Dec. 5, 2019

Related U.S. Application Data

(60) Provisional application No. 62/732,761, filed on Sep. 18, 2018, provisional application No. 62/680,074, filed on Jun. 4, 2018.

(51) Int. Cl.
*H04L 29/08* (2006.01)
*H04L 29/06* (2006.01)
*G06F 8/61* (2018.01)

(52) U.S. Cl.
CPC ............... *H04L 67/34* (2013.01); *G06F 8/61* (2013.01); *H04L 63/0435* (2013.01); *H04L 63/101* (2013.01); *H04L 67/32* (2013.01)

(58) Field of Classification Search
CPC ... H04L 67/34; H04L 63/101; H04L 63/0435; H04L 67/32; G06F 8/61
See application file for complete search history.

(56) References Cited

U.S. PATENT DOCUMENTS

| 7,979,512 B2 | 7/2011 | Chandrasekhar et al. |
| 8,473,325 B2 | 6/2013 | Barnhill, Jr. et al. |
| 2006/0179106 A1 | 8/2006 | Turner et al. |
| 2008/0235357 A1 | 9/2008 | Gustafsson |
| 2009/0187413 A1 | 7/2009 | Abels et al. |

(Continued)

OTHER PUBLICATIONS

International Search Report and Written Opinion in counterpart International Application No. PCT/US2019/034360, dated Sep. 11, 2019, 12 pages.

(Continued)

*Primary Examiner* — Michael A Keller
(74) *Attorney, Agent, or Firm* — Edell, Shapiro & Finnan, LLC

(57) ABSTRACT

Presented herein are methods associated with a Services Delivery Platform (SDP) architecture for a distributed application building blocks, such as microservices, deployment-agnostic. The system includes a central compute node and numerous remote compute nodes. Techniques are provided to "onboard" and assimilate the capabilities of remote compute nodes so that they are an integrated part of the SDP system and can be accessed and used in connection with one or more services provided by the SDP system.

20 Claims, 11 Drawing Sheets

(56) References Cited

U.S. PATENT DOCUMENTS

2014/0092773 A1     4/2014   Xun et al.
2015/0156118 A1*   6/2015   Madani ................ H04L 47/125
                                                           709/223
2015/0312894 A1* 10/2015   Chen .................... H04W 16/18
                                                           370/329

OTHER PUBLICATIONS

Tehama, "Complete SaaS-based work environments built for securing a global workforce", https://tehama.io/platform/, downloaded from the Internet Aug. 6, 2018, 9 pages.

* cited by examiner

AUTOMATICALLY AND REMOTELY ON-BOARD SERVICES DELIVERY PLATFORM COMPUTING NODES

PRIORITY CLAIM

This application claims priority to U.S. Provisional Application No. 62/732,761, filed Sep. 18, 2018, and to U.S. Provisional Application No. 62/680,074, filed Jun. 4, 2018. The entirety of each of these applications is incorporated herein by reference.

TECHNICAL FIELD

The present disclosure relates to distributed computing systems.

BACKGROUND

With the advent microservices and distributed computing techniques, opportunities have been made available to leverage the computing capabilities of remotely deployed computing entities. These remote computing entities may perform various computing functions, such as machine learning, and may have their own libraries and other data resources. There are tremendous technological benefits that can be achieved from making the computing and data resources of remotely deployed computing entities available, in a seamless manner, to provide various services to a user without the user having any specific knowledge of the detailed architectures of the remote computing entities.

DESCRIPTION OF EXAMPLE EMBODIMENTS

Overview

Figure 1:
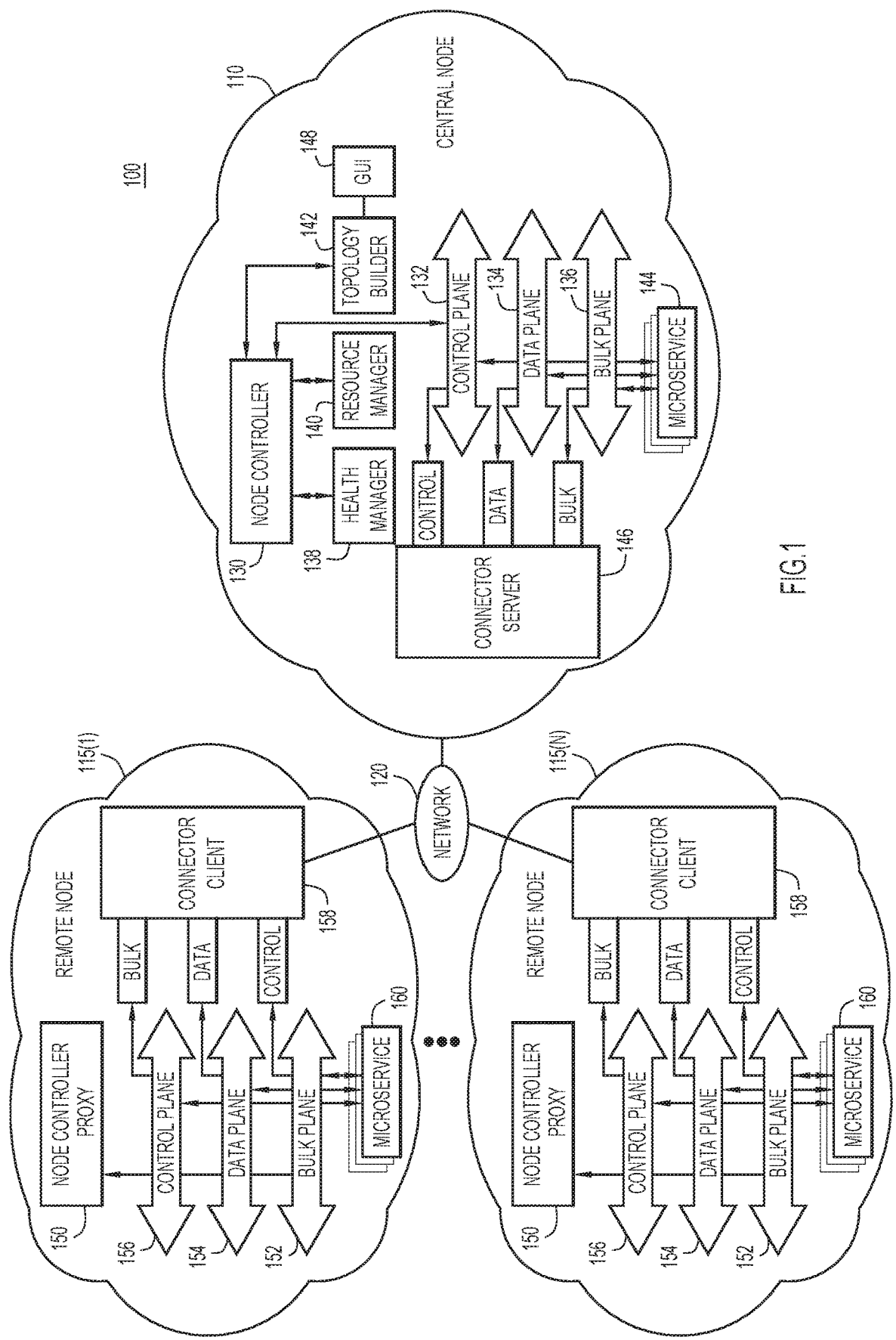
FIG. 1 is a high-level block diagram of the Services Delivery Platform (SDP) system according to an example embodiment.

Presented herein is a system and methods associated with a distributed computing system architecture configured to distribute application building blocks, such as microservices, in a deployment-agnostic manner. The system includes an SDP Central Node (also referred to herein as a "central compute node" or "central node") and numerous SDP Remote Nodes (also referred to herein as a "remote compute node" or "remote node"). More specifically, techniques are presented herein to "onboard" and assimilate the capabilities of SDP remote nodes so that they are an integrated part of the SDP and can be accessed and used in connection with one or more services provided by the SDP system.

In one embodiment, a method is provided that is performed at a central node in a distributed computing system that includes a plurality of remote compute nodes whose computing resources and software functions are made available in a platform agnostic manner to users of the distributed computing system. The method involves the central node receiving from a candidate remote compute node, a request to be onboarded to the distributed computing system, the request including information about computing capabilities and configurations of the candidate remote computing node. The central node generates unique security material for the candidate remote compute to securely communicate with the central node. The central node generates an install package that includes components to establish data plane and control plane communications between the candidate remote compute node and the central node. The central node downloads the install package to the candidate remote compute node. The central node initiates installation of the install package at the candidate remote compute node. The central node receives from the candidate remote compute node, an installation validation message indicating that the install package has been successfully installed on the candidate remote compute node. The central node updates a status of the candidate remote compute node to an online status as a functional remote compute node in the distributed computing system.

EXAMPLE EMBODIMENTS

A Services Delivery Platform (SDP) is presented herein that serves as an applications enablement platform to build, compose and distribute extremely scalable analytics applications that use machine learning libraries, batch processing frameworks, custom data processing applications and microservice architectures. The SDP integrates streaming (data in-motion) and batch (data at-rest) data from multiple sources, in addition to human and machine generated intellectual capital, to deliver scalable analytics applications. Microservices are core capabilities that have been broken down into autonomous modules that interoperate with each other, utilize an integrated data fabric, and are reusable across all platform layers and application service offerings.

The SDP system employs the concept of a logical entity that represents computing resources for executing computing processes. It provides an architecture that makes the distributed application building blocks, such as microservices, deployment-agnostic. The SDP provides two different concepts of these runtime environments, which are referred to as SDP nodes. A node could be a central node, which employs all SDP capabilities, such as streaming batch and machine learning, or a remote node, which is a scaled down representation of a SDP runtime environment that hosts only data-in-motion capabilities, with limited analytical features, i.e. microservices. Remote nodes are typically deployed to the fog and edge elements of a network.

The SDP system is a unified software system that enables the enterprise to adapt quickly with new innovations while optimizing existing investment. This is achieved by providing onboarding, integration and availability of data, as well as the ability to identify, extract and operate on different types of data, using platform capabilities in terms of building blocks, such as machine learning and microservices. One goal is to provide application developers and enterprises with a common set of tools and capabilities that can be leveraged, reused, shared and integrated without the need for highly specialized skills, such as machine learning experts or data scientists, to use the platform. The platform enables developers to focus on their business logic implementation, while using highly customizable building blocks and features.

Presented herein are techniques for automated onboarding of remote compute nodes in a distributed computing environment that connects remotely into the SDP ecosystem. The onboarding process can be customized as to such aspects as configuration, security and trust, established between a new/candidate remote compute node and the central node, to be part of the SDP ecosystem. Any microservices or user-developed business logic can be seamlessly distributed among the distributed computing environment without any change in the developer's host or configuration. Each SDP remote node can be viewed as a distributed computing environment. Each has different characteristics (security, etc.) that need to be accounted for when including them in the SDP ecosystem.

The remote node could be a Docker™ container, a bare metal computing apparatus, or a virtual machine. The remote node could be a single compute apparatus or a cluster of computing devices, like a data center. The resources offered by the remote node are identified. The computing power and memory of the remote node is the only limit as to the business logic that could run on a given remote node. All of this is determined for a remote node when it is onboarded to the SDP ecosystem.

In one embodiment, the remote node is classified based on an image size or footprint size. This helps to manage that resource allocation when deploying business logic to that remote node.

Reference is first made to FIG. 1. FIG. 1 shows a high-level software functional block diagram of the SDP system 100. The SDP system 100 includes a central compute node (central node) 110 and a plurality of remote compute nodes (remote nodes) 115(1)-115(N). In general, an SDP node is a compute environment (consisting of 1 or more hosts) where SDP data processing takes place. The end-to-end SDP system 100 consists of the central node 110 and zero or more remote nodes 115(1)-115(N) connected to it. The central node 110 communicates with the remote node nodes 115(1)-115(N) by way of network 120.

The central node 110 includes a node controller 130, a control plane 132, data plane 134, bulk plane 136, a health manager 138, resource manager 140 and topology builder 142. The central node 110 also runs one or more microservices shown at 144. There is also a connector server function 146 that enables persistent or on-demand connectivity between the central node 110 and one or more remote nodes 115(1)-115(N). An example graphical user interface (GUI) of a topology is shown at 148.

In one representation, the central node 110 may be a cloud computing entity (data center) and it may be a cluster of compute hosts (physical/virtual) that scales with compute resources. The central node enables bidirectional and secure connectivity with the remote nodes 115(1)-115(N), and integrates with existing enterprise assets via connectors and a connector framework. The central node 110 enables streaming and batch analytics, data exploration tools, as well as machine learning/artificial intelligence (ML/AI) capabilities. The central node 110 provides many services, including software lifecycle management, assets management, workflow orchestration and scheduling, Application Programming Interfaces (APIs), development and deployment studios and a data lake functionality.

Each remote node 115(1)-115(N) includes a node controller proxy 150, a control plane 152, data plane 154, bulk plane 156, connector client function 158 and one or more microservices 160. The node controller proxy 150 runs at every remote node and performs local management of all microservices running at its node location. The node controller proxy 150 interacts with, and carries out, command execution relayed by the node controller 130 running at the central node 110.

Logically, every SDP remote node has a resource manager, such as the resource manager 140 shown for the central node 110 in FIG. 1. Depending on the size of the remote node, and the services running there, the resource management function may be simplified and/or statically defined (e.g. deploying an SDP remote node using a Raspberry Pi™ host where only a few microservices are running at that node).

For the control and data planes that exist at the central node 110, there also exists a separate set of control, data and bulk plane segments at each remote node 115(1)-115(N) as shown in FIG. 1 and described herein. Each control, data and bulk plane segment is powered by a local message bus infrastructure, but is connected seamlessly back to the central node 110 via the connector client 158.

The SDP system 110 enforces a clear separation between logical communication planes by provisioning three distinct planes for data, control and bulk data exchange, as shown in FIG. 1.

One design principle behind employing three different logical planes, is that the traffic in one plane does not affect the traffic in the other planes. Also, the three segregated planes also ensure that platform-specific commands, such as microservice life-cycle-management commands (i.e. start, stop, suspend, resume and health metrics collection commands) are always delivered to platform and application components, regardless of the current overall processing load of the platform. Thus, the control plane can still operate if the data plane is down. During deployment, SDP system 110 configures redundant messaging (i.e. Kafka® streaming platform brokers by Apache Software Foundation) clusters for providing high-availability (HA) support. Since each plane will have its own cluster of distributed streaming platform brokers, the planes can be configured to have a different number brokers in the cluster to meet different traffic demands of the other planes.

In the SDP system 100, the data plane is used as the main channel for transferring and processing application data. This includes periodic file uploads and real-time data streaming (e.g. stream of Simple Network Management Protocol (SNMP) traps or Netflow data). The data plane would typically have multiple microservices stitched together in order to transfer data from a data producer to a data consumer. Data flowing through multiple microservices might undergo multiple transformations, processing, and enrichment until it reaches a destination. Data flows may be defined with the microservice topologies. At the entry point into the system, data would be parsed and mapped to some normalized format. Participation in the data plane is optional. For example, there may be an Extraction, Transformation and Loading (ETL) microservice that takes data from one data repository, pushes the data through some kind of transformation, and then stores the data into another repository. In this case, there is no need for a topology and a data plane.

In the SDP system 100, the control plane has a two-fold purpose:

1. To perform control functions. These include start, stop, restart microservice, health monitoring, logging, etc. Every microservice reports its health status on the control plane at the preconfigured interval. There is a default implementation of the health reporting (for example, a default implementation provides some statistics like number of messages processed per second or Java Virtual Machine (JVM) free heap size).

2. To send requests to the microservices to perform some business functions, for example, to initiate discovery, or to perform collection (on-demand or scheduled). This is also referred to as a command function of the control plane.

Every microservice is part of the control plane.

The bulk plane is a third plane, which is a special case of the data. As the name indicates, it is used as a channel for transferring a large amount of data. It is used to optimize the use and speed of transfer for regular streaming data, which uses the data plane. This plane is dedicated for file transfer, which is available for SDP microservices with requirements to transfer files between different SDP nodes.

Figure 2:
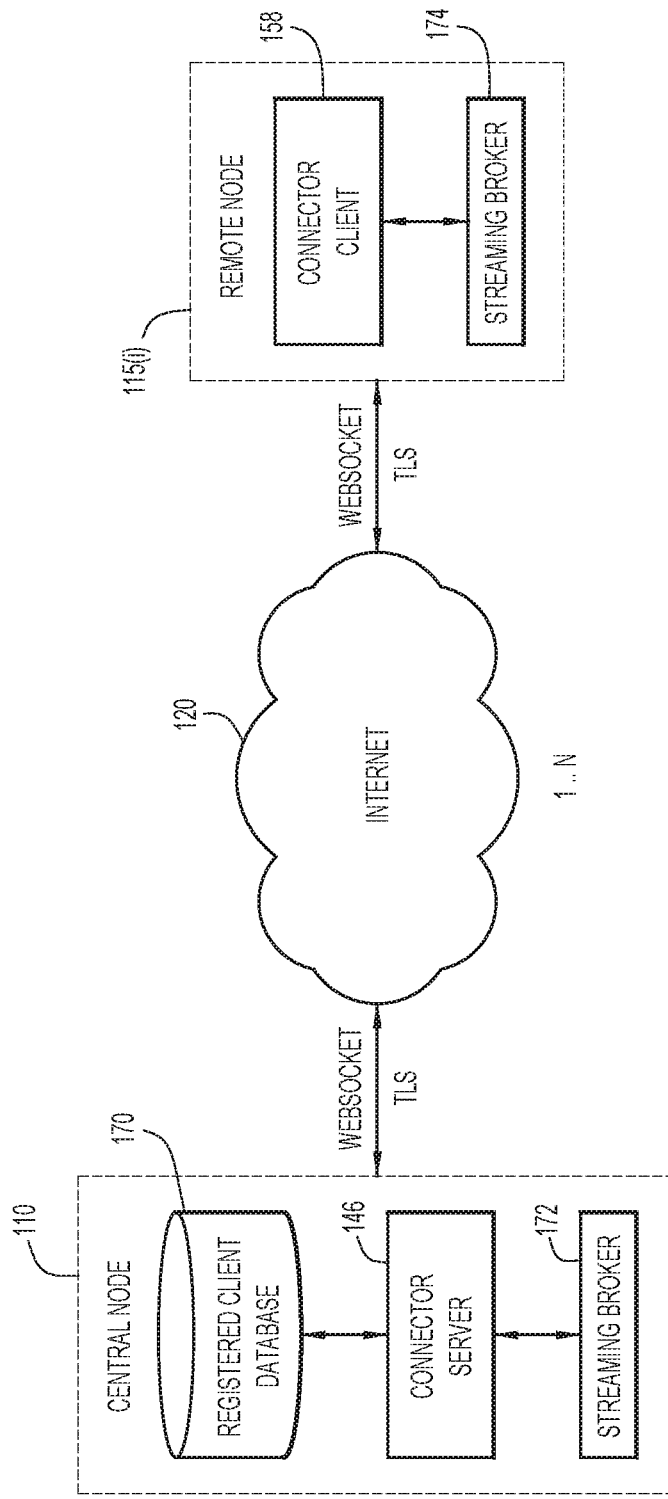
FIG. 2 is a block diagram illustrating a client-server based architecture of the SDP system, according to an example embodiment.

Reference is now made to FIG. 2. The connector function is a core component, and may be based on a client-server architecture. The main responsibility of the connector function is to handle the secure bi-directional communication channel between the central node 110 and any connected SDP remote nodes, shown at reference numeral 115(*i*).

The communications may take place over a secured channel, such as a Transport Layer Security (TLS) bi-directional websocket channel. There is a registered client database 170 at the central node 110 to govern communication with only registered remote nodes as "clients". The connector server 146 and connector clients 158 rely on streaming brokers (e.g., Kafka brokers) 172 and 174, respectively, as messaging backends.

The connector server 146 may be a wrapper over the Java API for WebSocket (JSR 356) standard to which connector clients 158 can connect. This component is deployed on the central node 110, but can also be deployed in any other site that wants to act as a server.

The connector server 146 performs the following functions:

Listens for WebSocket connection requests from the connector client 158.

Authenticates the connection request against a list of registered clients in database 170.

Starts sending and receiving data to/from the connector client 158.

The connector client 158 has the same set of functions but instead of authenticating connections, it sends an authentication token to the connector server 146. Both components implement a keep-alive and reconnection mechanism to maintain a continuous connection.

The connector server 146 and connector client 158 support sending two types of data: streaming data and bulk data. Streaming data is mainly used for communication between SDP microservices and bulk data is used for transferring large files between nodes. In case of interrupted connection, the connector functions will resume data transfer from the last offset once the connection is restored. The connector functions implement a fair policy mechanism to ensure the connection bandwidth is equally shared among concurrent connections. The connector server 146 also collects metrics, including but not limited to: the number of active client connections and the number of messages sent/received from both ends. The connector server 146 supports a pluggable authentication module (PAM) which can be extended to support more authentication mechanisms other than the out-of-the-box Hypertext Transfer Protocol (HTTP) basic authorization and JSON Web Tokens. The connector server 146 may also support HTTP and SOCKS5 proxies.

Figure 3:
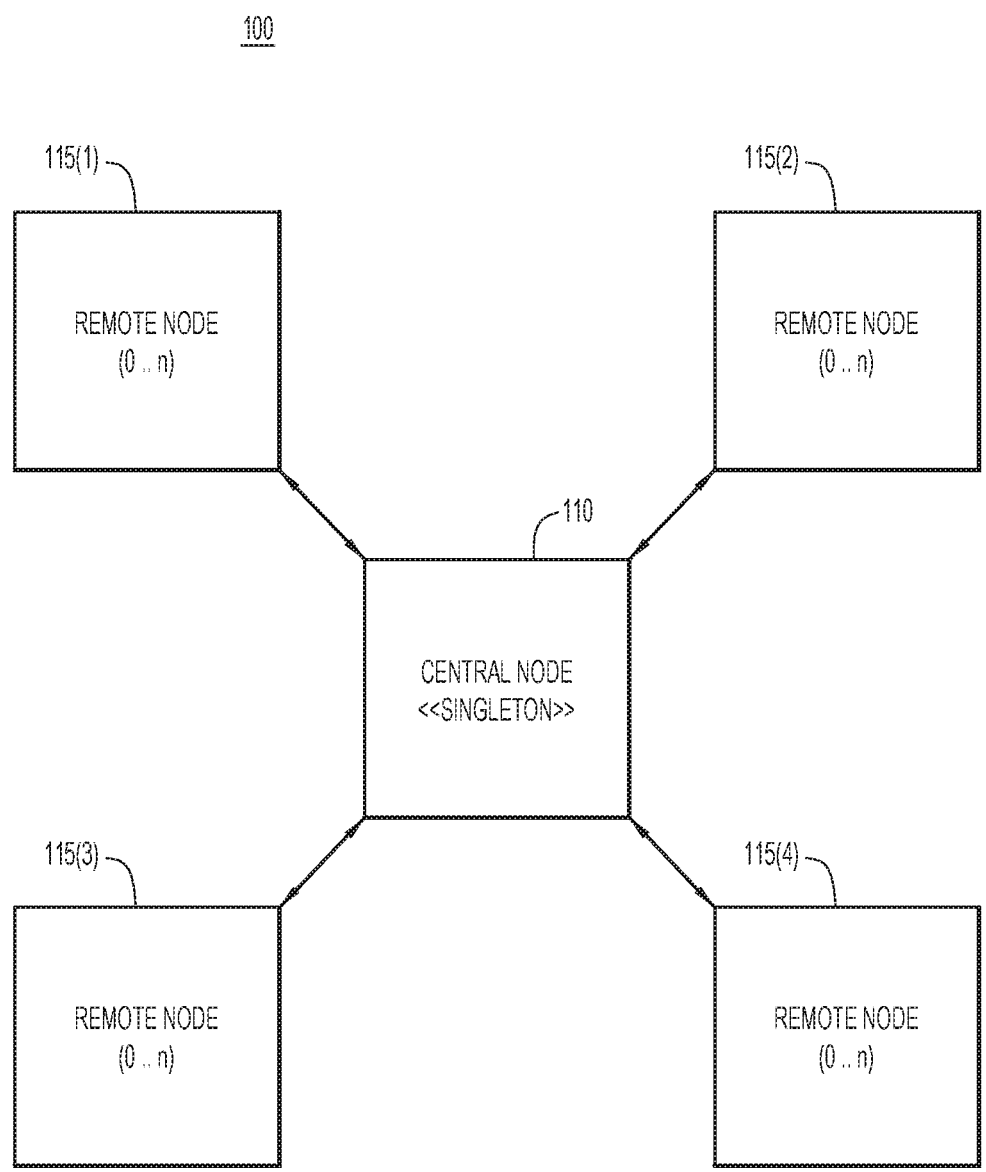
FIG. 3 is a diagram illustrating communication between an SDP central node and SDP remote nodes, according to an example embodiment.

Reference is now made to FIG. 3. A node is considered a compute environment, which may consist of one or more hosts, where SDP data processing takes place. In any SDP installation, there exists one—and only one—centralized controlled node, central node 110, and zero or more compute environments, with deployed subset of SDP capabilities, remote nodes 115(1)-115(4) in the example configuration shown in FIG. 3. As depicted in the overall logical architecture diagram of FIG. 3, the SDP system 100 provides core connectivity components that enable bi-directional communication of data and control messages between remote node(s) and the central node.

The remote nodes may connect to the central node using a star logical topology for exchanging both data and control messages. While the control channel is kept "always-on" to manage the remote node resources and business logic microservices/workflows, the data channels—both data streaming and file uploads—can be kept always-on, disconnected with no data exchanges between remote nodes and central node, or activated based on a pre-scheduled time or event policy. The topology may be expanded to a fully meshed topology, which allows remote nodes to collaborate in an exchange of data and process execution without the need to go through the central node. This will deliver a faster time-to-action and reduce even further the network congestion whenever data exchanges and analytics can be completely executed via the pool of deployed remote nodes.

Techniques are presented herein for automation of the process of configuring a remote computing environment to operate as an SDP remote node. This includes full automation of the onboarding process, customization of the installation image for selected software, establishing a secure bi-directional communication channel between the node, and the ability to manage, monitor and deploy distributed SDP application workflows to the remote node.

Managing and securing distributed applications is a challenging endeavor. Remotely onboarding, securing and managing remote computing resources, which can be physically deployed on a customer's premise, is an even more complex problem to solve. Methods are provided herein for remotely and automatically configuring and managing a remote computing environment so that they are operating as SDP remote nodes, with full connectivity and reachability to the SDP central node, in the data and control planes. Ensuring that the customer's environment is operational and is not compromised is an important part of this design.

Presented herein are techniques that automate onboarding a SDP computing environment remotely, so that it becomes an integral part of the SDP ecosystem. These techniques eliminate the need for a human manual process, where a field engineer is required to travel to installation sites (e.g. partners' and customers') and physically bootstrap the onboarding process, starting with setting up software dependencies, downloading packages, configuring the software stack, applying security configurations and establishing connection with the central node.

The solution presented herein has the following features:

The design can be applied to different types of hosting environments:
    a. On-premise (private cloud)
    b. Data Center
    c. Cloud
    d. Cloud-broker (hybrid cloud)

Remote node on-boarding process is remotely initiated and remotely controlled.

Support for customization of installed software packages.

Automated generation of signed security certificates for remote nodes.

Self-installed software packages, with acknowledgement of final result.

Bi-directional secure communication channels between central node and remote nodes.

No additional opened ports on the remote node side.

On-boarded remote nodes are managed and accessed from the central node.

SDP Remote Node Overview

Figure 4:
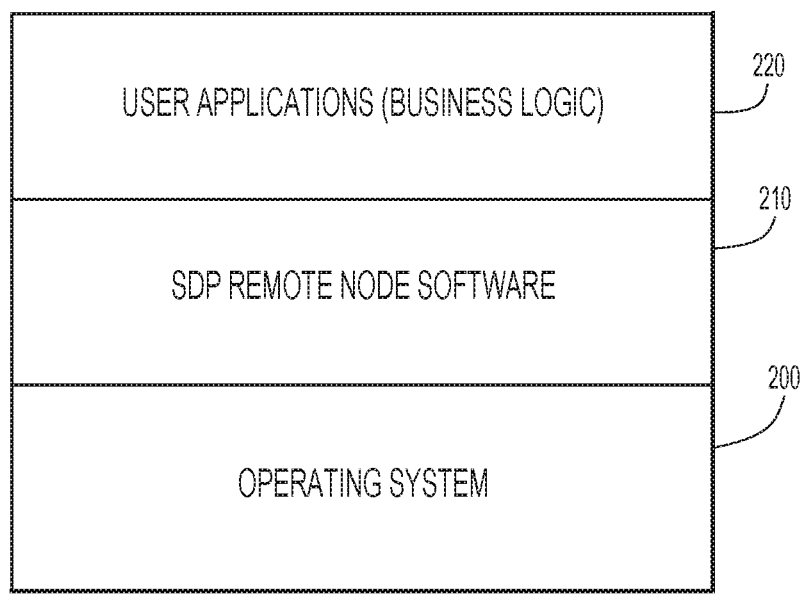
FIG. 4 illustrates a high-level software architecture diagram of an SDP remote node, according to an example embodiment.

Reference is now made to FIG. 4 which shows a high-level functional diagram of a remote node, shown generally at reference numeral 115(i). The remote node 115(i) may be any of a variety of types of hosting environment, such as a virtual machine (VM), Docker container or bare metal. From a software functionality standpoint, the remote node consists of an operating system 200, SDP remote node software 210 that is created by the central node and installed on the remote node in order to enable it to function as an SDP remote node in the SDP system, and user applications (business logic) 220. The SDP remote node software 210 occupies the middle layer between the hosting operating system 200 and the deployed application logic (user business logic) 220 to provide the platform capabilities of an SDP remote node.

SDP Remote Node Logical Architecture

Figure 5:
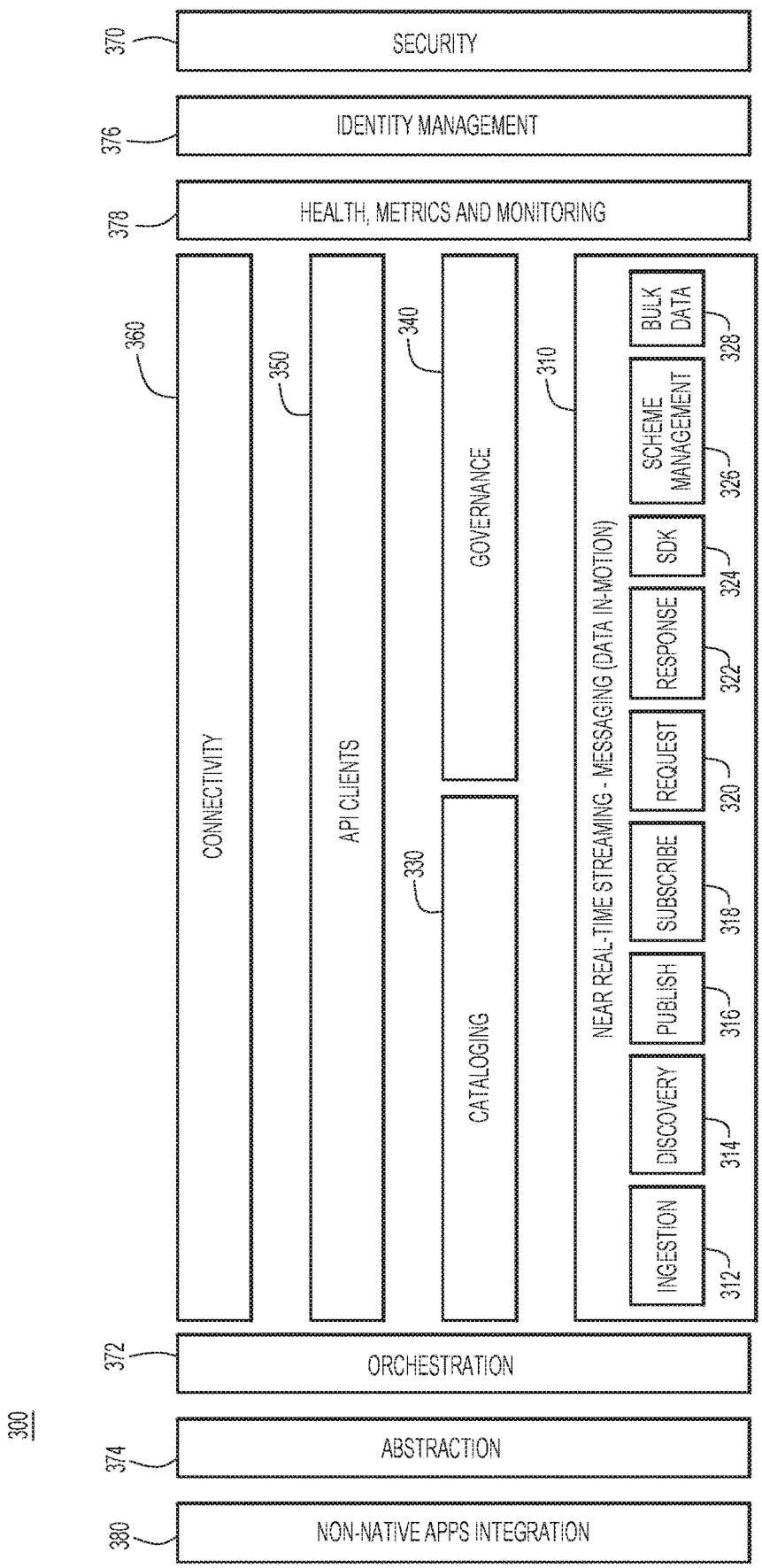
FIG. 5 is a more detailed software architecture diagram of an SDP remote node, according to an example embodiment.

FIG. 5 illustrates a logical software architecture 300 of an SDP remote node. The SDP remote node architecture enables processing data-in-motion (i.e. data streams). This is typically performed by workflows consisting of interdependent business logic, implemented as SDP microservices Docker containers. Additionally, it provides the mechanisms to route data between the current environment of the remote node and the SDP central node.

All these building blocks (microservices), in addition to the data sets they operate on, are organized and available for sharing in the SDP ecosystem and reuse capabilities through the SDP integrated catalog. The catalog employs a governance process, which enables enterprises and owners to have full control over sharing (or not sharing) any building block of the application or the catalog entry.

The main SDP components deployed to SDP remote nodes are as follows.

Near real-time stream messaging stack 310. This includes the messaging infrastructure used for a publish-subscribe design pattern implementation for user stream data. In one embodiment, the SDP system employs a Kafka cluster for this implementation, with a separation between user data (data plane) and platform manageability (control plane). The messaging stack 310 includes an ingestion function 312, a discovery function 314, a publish function 316, a subscribe function 318, a request function 320, a response function 322, a software development kit (SDK) function 324, a schema management function 326 and a bulk data function 328.

Cataloging function 330. The SDP system provides cataloging services for the SDP ecosystem so that application workflow microservices can be deployed, connected and executed on the remote node, as well as communicate with central node. This is enabled by a cataloging function 330. SDP microservices are platform-agnostic. In other words, the same microservice is deployed, executed and monitored with the same mechanics regardless of whether it is executing on remote nodes or the central node.

Governance function 340. With the cataloging services, a governance function 340 is part of the remote node components so that enterprises and users have full control over the visibility, access and subscription model to data consumed/produced by the microservice.

API clients 350. The platform provides API components 350 for exposing Hypertext Transfer Protocol/HTTP/s Representational State Transfer (REST) APIs either internally or externally.

The connectivity component 360 is the core component responsible for establishing a secure bi-directional communication channel with a remote node. All traffic (data and control) between remote nodes and central node go through this connection channel.

In addition, the platform employs multiple vertical facilities including a security function 370, an orchestration function 372 for orchestrating platform and user components (Docker containers), an abstraction function 374 for accessing a streaming stack, an identity management function 376, core components 378 for collecting runtime health, usage and monitoring metrics. In addition, there is an integration function 380 to integrate external (non-SDP) user applications through API (REST) or messaging (Kafka) services.

Figure 6:
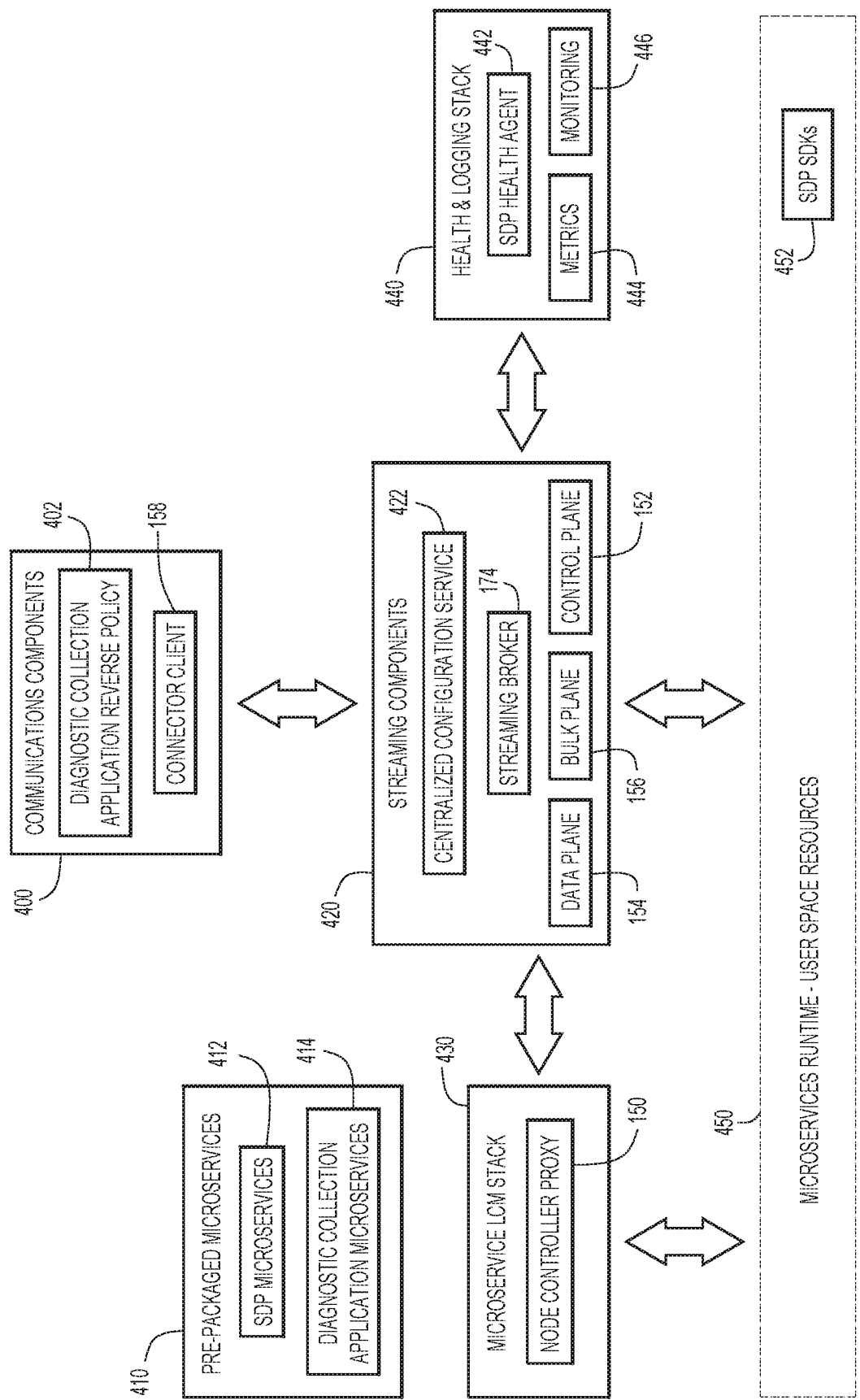
FIG. 6 is a functional diagram illustrating a streaming model of an SDP remote node, according to an example embodiment.

FIG. 6 is a diagram that illustrates a functional composition of the SDP remote node software. The SDP remote node software can be categorized into several categories: communication components 400 including the connector client 158 and a diagnostic collection application reverse proxy 402. The diagnostic collection application reverse proxy 402 is an application that uses SDP remote node capabilities to collect device diagnostics to be sent back to the SDP central node for analytical processing. The diagnostic collection application reverse proxy 402 may be provided as a virtual machine image that is installed on a hardware appliance in a customer's network. The communication components 400 include diagnostic collection application connectivity, which involves Common Service Platform Collector (CSPC) connectivity components, including the diagnostic collection application reverse proxy 402, security certificates and files, and any dependences that are required to establish the connectivity from the remote node back to central node via the diagnostic collection application reverse proxy 402. There are pre-packaged microservices 410 including SDP microservices 412 and diagnostic collection application microservices 414; streaming components 420, including a centralized configuration service 422 (such as Apache Zookeeper™, the streaming broker 174 (e.g., Apache Kafka), the control plane 152, data plane 154 and bulk plane 156; a microservice Life Cycle Management (LCM) stack 430 including the node controller proxy 150; and a health & logging stack 440 including SDP health agent 442, a metrics agent 444 and a monitoring agent 446; and microservice runtime-user space resources 450 including an SDP SDKs 452. The pre-packaged microservices 420 are the business logic components (software components) that make up the diagnostic collection application. When creating the virtual machine image for the diagnostic collection application, there are the SDP remote node components (i.e. the listing provided in the table below) and the diagnostic collection application software components on top of the SDP remote node, which are referred to herein as pre-packaged microservices.

SDP Remote Node Footprint

The table below details examples of the remote node components and their footprint.

| Component | Disk (MB) | RAM (MB) | Number of Instances | Total Disk (MB) | Total RAM (MB) |
|---|---|---|---|---|---|
| Streaming Broker (e.g., Kafka) | 40 | 400 | 3 | 120 | 1200 |
| Centralized Configuration Service (e.g., Zookeeper) | 60 | 120 | 3 | 180 | 360 |
| Control Proxy | 110 | 72 | 1 | 110 | 72 |
| Connector Client | 17 | 75 | 3 | 51 | 225 |
| SDP Health Agent | 22 | 45 | 1 | 22 | 45 |
| Metrics | 38 | 700 | 1 | 38 | 700 |
| Monitoring | 194 | 264 | 1 | 194 | 264 |
| Docker Daemon | Small | Small | 1 | Small | Small |
| Total (average) | | | | 715 | 1786 |

SDP Remote Node Automated Onboarding Process

Figure 7:
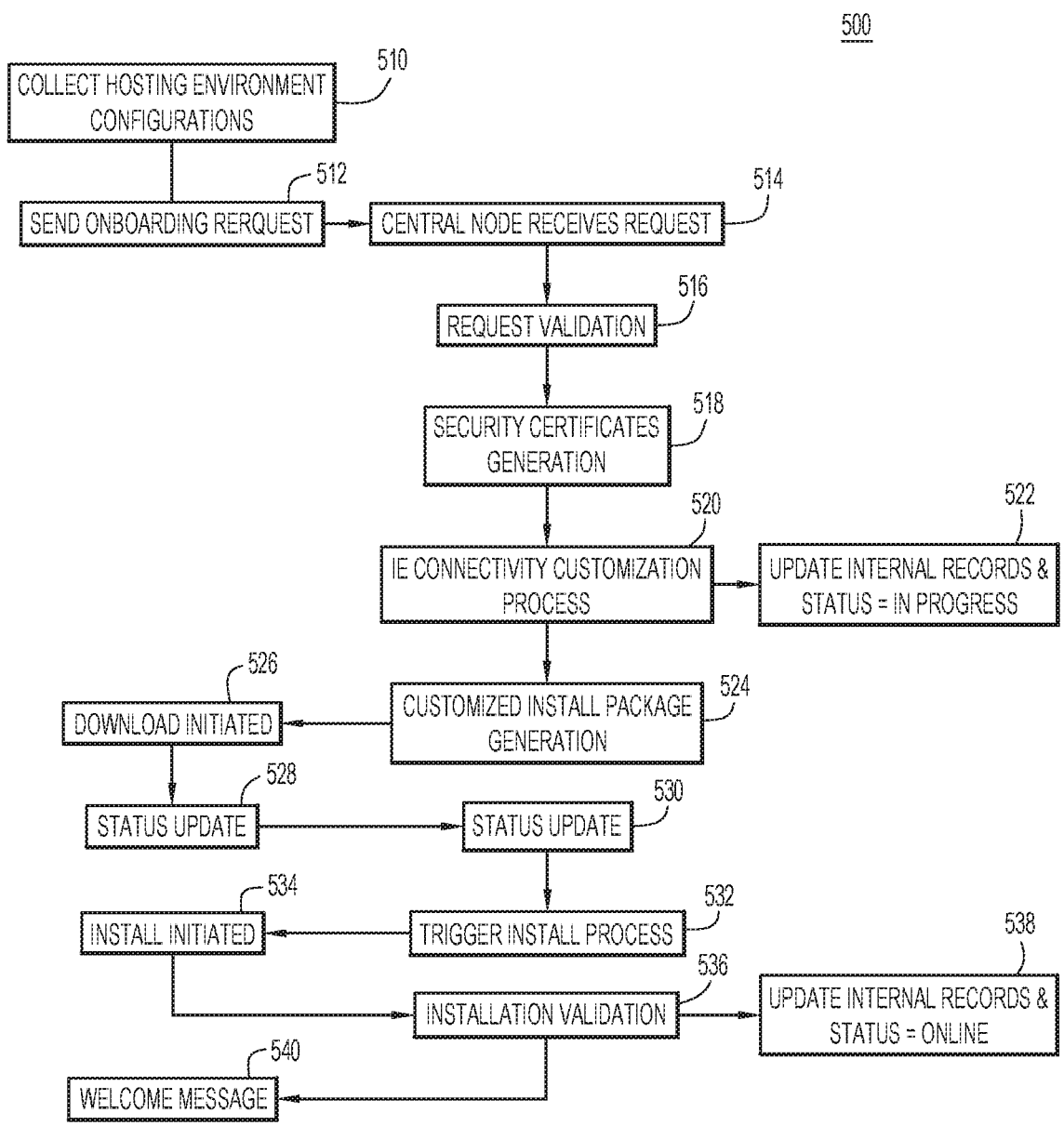
FIG. 7 is a flow chart depicting operations for onboarding an SDP remote node, according to an example embodiment.

A process of onboarding an SDP remote node goes through different logical steps, which are processed in a sequential order. An overview of this process 500 is depicted in FIG. 7, where the left column represents operations of the remote node, and the middle and right columns represent operations of the central node.

The operations of the onboarding process are as follows.

At 510, the remote node tenant administrator collects all information required for the SDP system to successfully connect and manage that potential/candidate remote node. This information includes the type of hosting environment (e.g. Cisco Aggregation Service Router 1000, bare metal, etc., gateway IP address, Operating System, amount of random access memory (RAM), additional servers if any, etc.).

At 512, the remote node sends the onboarding request. Typically, this process is initiated using an SDP User Interface (UI) function. However, additional external APIs can be developed to provide the same functionality using HTTP POST, with configurations included in a FORM and with authentication headers.

At 514, the central node receives the onboarding request—either from the direct API call or from SDP Common Web Service (CWS) gateway, as indicated in the previous step. This marks the start of the onboarding workflow process at the central node. The SDP CWS is responsible for servicing internal and external API requests, including the SDP UI API. It terminates the API request, routes it to the appropriate backend component at the central node and provides the response back to the remote node.

At 516, the received configurations are validated. All mandatory data needs to be present and authentication of the requester confirmed. Otherwise, an error response is returned to the remote node (or displayed in the UI). Examples of mandatory data include: organization name (name of the organization that owns the remote node); administrator(s) name(s) and email address(es); hardware make/manufacturer; available memory, available central processing unit(s); disk space; and IP address of the remote node.

At 518, security certifications are generated. This is the first security sub-process, which is tasked with generating the security certificate for the remote node. This process involves generating the unique security keys/certificate to associate with the entity and node being onboarded. Additionally, remote node keys/certificate is added to an ACL (Access Control List) database for mapping the list with upcoming requests from the remote node (i.e. identifying that the remote node can communicate with central node). Finally, there is a unique node identifier (ID) associated with each remote node so that this key maps to the ACL/data associated with that node. That node ID is used by the APIs and by the SDP UI to address different nodes.

At 520, the InsightEngine connectivity customization is performed. This entire workflow for all the required InsightEngine required automation tasks. This also includes the second security sub-process, tasked with generating a registry certificate and configurations for the reverse proxy components. Pending verification and a required proof of certificate (POC), IE security certification could be used and this operation and operation 518 may be combined.

The InsightEngine (IE) is an existing application deployment based on an external appliance that is hosted at the customer's premise. The SDP remote node onboarding described herein supports that model (brown field). In a brown field model, there is an Open Virtual Appliance (OVA) image (the typical deployment artifacts used by IE for installation), and it is customized with SDP remote node onboarding components, and security keys and certificates to enable that IE remote node to communicate with the SDP central node. This is in addition to the support of green field new SDP remote node onboarding.

Next, at 522, the central node initializes all required data structures and records that are required to onboard and manage this prospective remote node. However, a status record or field is generated to enable recovery of a session, resuming a session and cleanup.

At 524, an install package (consisting of binaries) is generated. The main capabilities of this customized install package are the SDP core components to establish the proper data and control planes for SDP streaming data, secure (2-way) communication with the central node, life-cycle-management capabilities for remote node microservices, health monitoring and logging capabilities, installation of user microservices (i.e. Docker containers) and orchestrating the microservices using an orchestration platform, such as the Kubernetes orchestration platform. The install binaries contain all those dependencies as well their customized external configurations to successfully launch all the SDP core components and establish connection with the SDP central node.

Customization of the remote node can be categorized into two different categories: Configurations and Software Binaries. Configurations includes all external configuration files for the different SDP components, such as the connector client 158 and controller proxy 150. Those configurations are created for each remote node installation to identify it and ensure it is unique so that when communications are established with the central node, the central node can determine which node is authorized. Also, communications from the central node, such as user data streams, can be correctly delivered to the destination stream (which translates to a Kafka topic being serviced on a specific remote node). An important part of the configurations is the unique node ID, which the central node generates and assigns to a remote node during the onboarding process.

Software Binaries are the actual software components that are configured and bundled into the installation package. By default, this includes all the components listed in the table above. However, for some constrained environments (e.g., limited resources remote nodes with limited disk space) a trimmed down or scaled down stack can be customized. For example, the health and logging stack 440 may be removed from the software installation bundle.

Once the package is built, download to the remote node starts as shown at 526. This is a PUSH model so that the remote node does not PULL indefinitely until the package is ready. As indicated at operations 528 and 530, acknowledgement of the reception of the package, and a checksum verification is required before the central node proceeds. Upon verification of download completion and validation, a new task starts on the central node. Another PUSH request is initiated to the remote node.

At 532, the central node initiates the actual package un-archiving and installation process at the remote node. At 534, the installation process starts at the remote node. When completed, an acknowledgment is sent to the central node.

At 536, upon receiving the installation validation, which indicates the finalization of the remote node onboarding process, the SDP central node triggers finalization state tasks at 538. This is the cleanup and finalization task. All install records are updated (e.g. timestamps, catalog entries, etc.) and the remote node status is updated to 'online'.

At 540, a completion message is sent to the remote node indicating the finalization of the process and that the now remote node is fully functional as part of the SDP ecosystem. At this point, the candidate remote node is no longer a "candidate" but is instead a remote node that is part of the SDP ecosystem.

In summary, the process 500 involves collecting data about a potential/candidate remote node, generating a process in the background to customize what will be installed on that remote node. The process 500 manages discovery, establishing security as to who has read/write access to remote node assets, in order to determine a remote node is to be assimilated into the SDP ecosystem. The user/remote node is generally unaware of the onboarding process. Once onboarded to the SDP ecosystem, the remote node can share its software or hosted environment with the SDP ecosystem to be available for usage by the SDP ecosystem community, without the user/remote node knowing much at all about the SDP.

SDP Remote Node States

Figure 8:
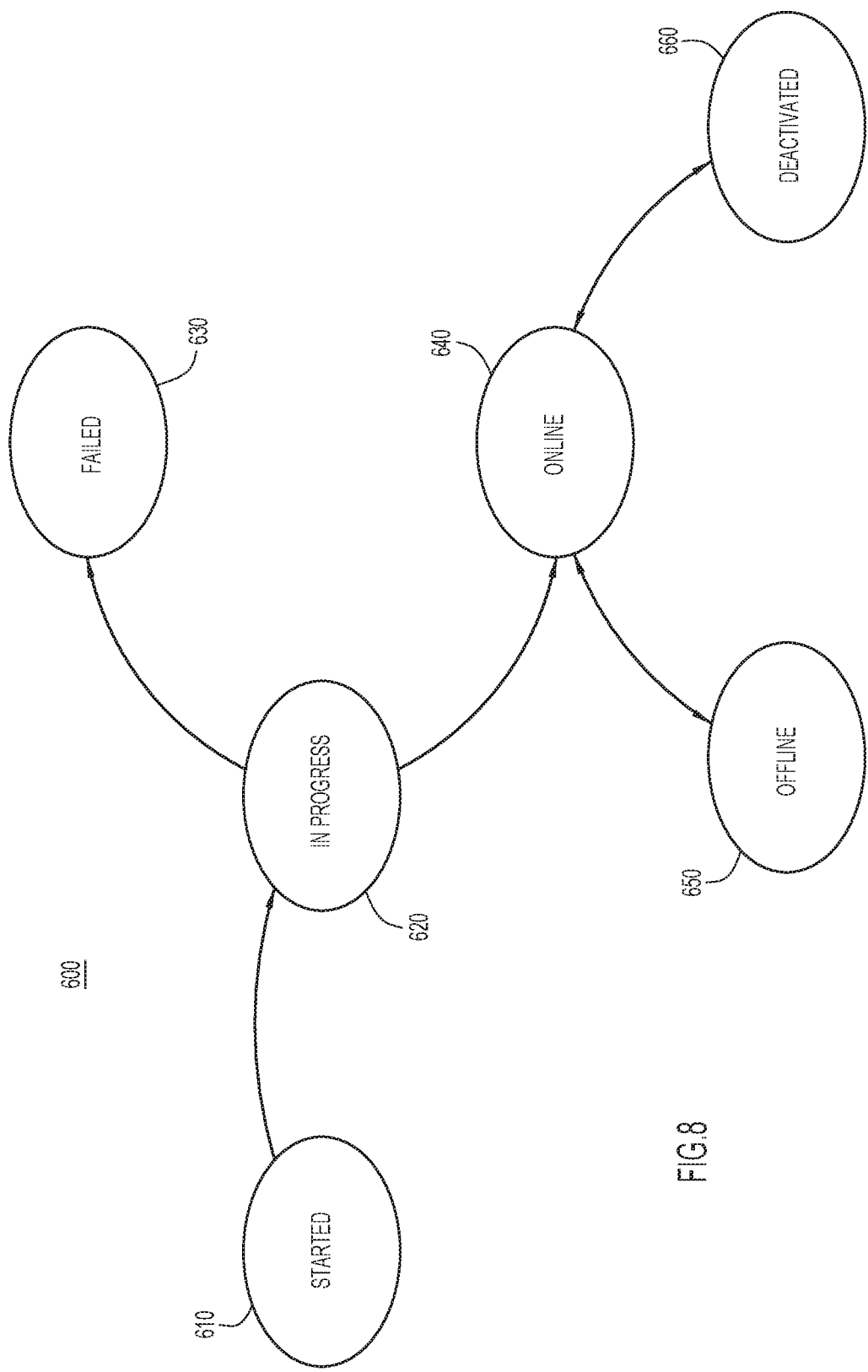
FIG. 8 is a diagram illustrating SDP remote node states, according to an example embodiment.

Reference is now made to FIG. 8. Keeping an accurate state of the remote node important. It is useful for processing and possibly recovering/resuming the onboarding process itself, and for managing the remote node from central node.

The diagram of FIG. 8 illustrates a state machine 600 that is maintained by the central node for each remote node. The states are Started 610, In Progress 620, Failed 630, Online 640, Offline 650 and Deactivated 660, and are explained in the table below.

| State | Trigger(s) | Description |
|---|---|---|
| Started | 1. UI Remote Onboarding Process<br>2. API Remote Onboarding Request | Entire process kick start, initiated by tenant administrator of remote node. |
| In Progress | Validation of configurations and request metadata dependencies. | Encompasses progressing with all required tasks to fully and successfully connect to the SDP. |
| Failed | 1. Invalid configurations<br>2. Misconfigurations<br>3. Security certificates errors<br>4. Failed IE API calls | At any step in the process the state moves to Failed when any dependencies are not met. |
| Online | 1. Successful install ACK received<br>2. Periodic heartbeat | SDP Connector client is configured with a heartbeat to report back status. |
| Offline | 1. Heartbeat is not received<br>2. API request | Tenant administrator can select to disconnect nodes if required. |
| Deactivated | API request | Similar to offline, however, can be activated and keeps historical data and configurations. |

SDP Remote Node Representation Relationship Model

Figure 9:
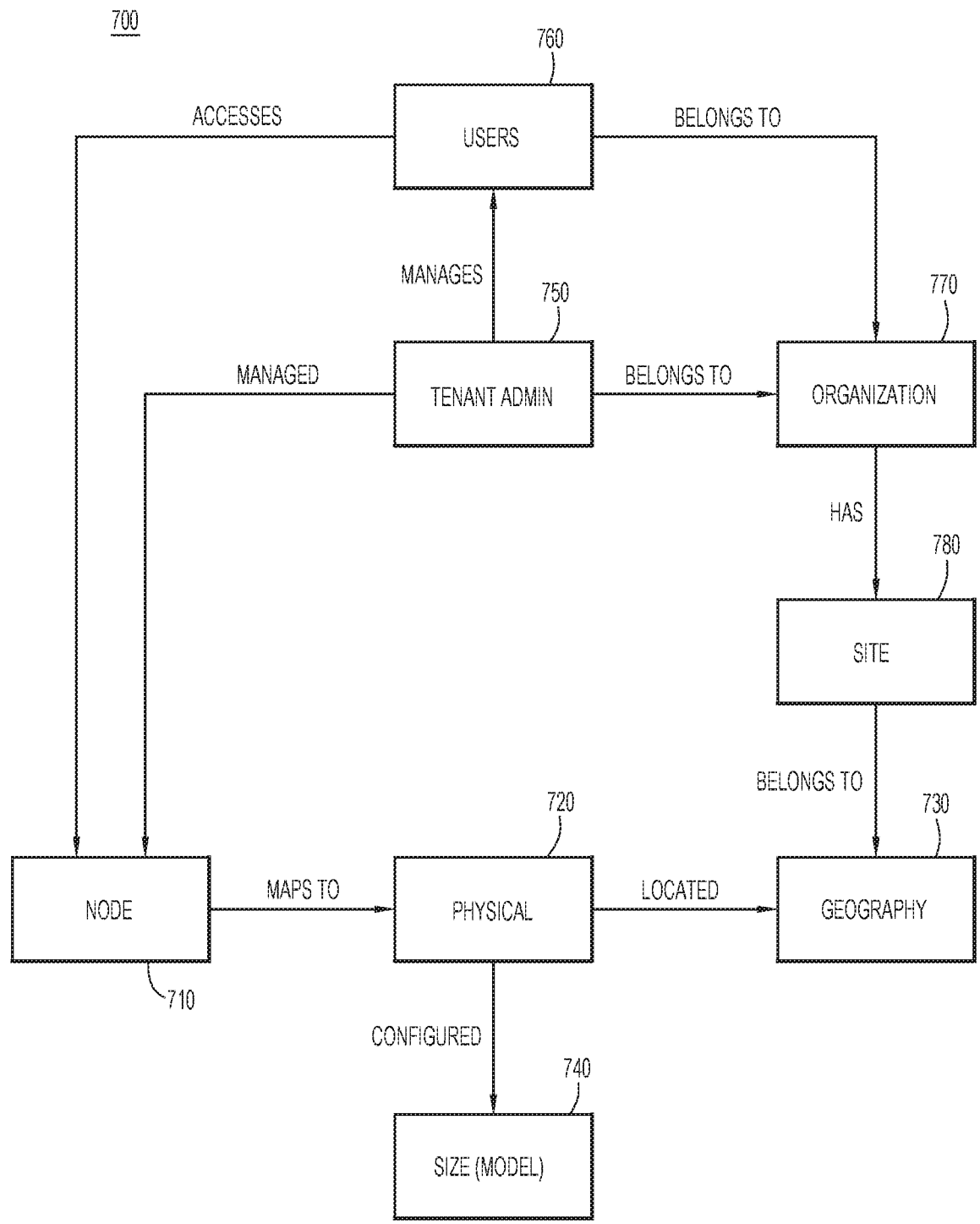
FIG. 9 is a diagram depicting an SDP remote node role-based access control model, according to an example embodiment.

For assisting the SDP governance process and employing a Role-based Access Control (RBAC) model, the SDP defines its node ownership and access relationship—for central and remote nodes. This is illustrated in FIG. 9. In this model 700 shown in FIG. 9, a node 710 maps to a physical entity 720 located at a particular geographical location 730. The physical entity 720 is configured according to a size model 740. A tenant administrator (admin) 750 manages users 760, and both the tenant admin 750 and the users 760 belong to an organization 770 that has a site 780 that belongs to the geographical location 730.

Figure 10:
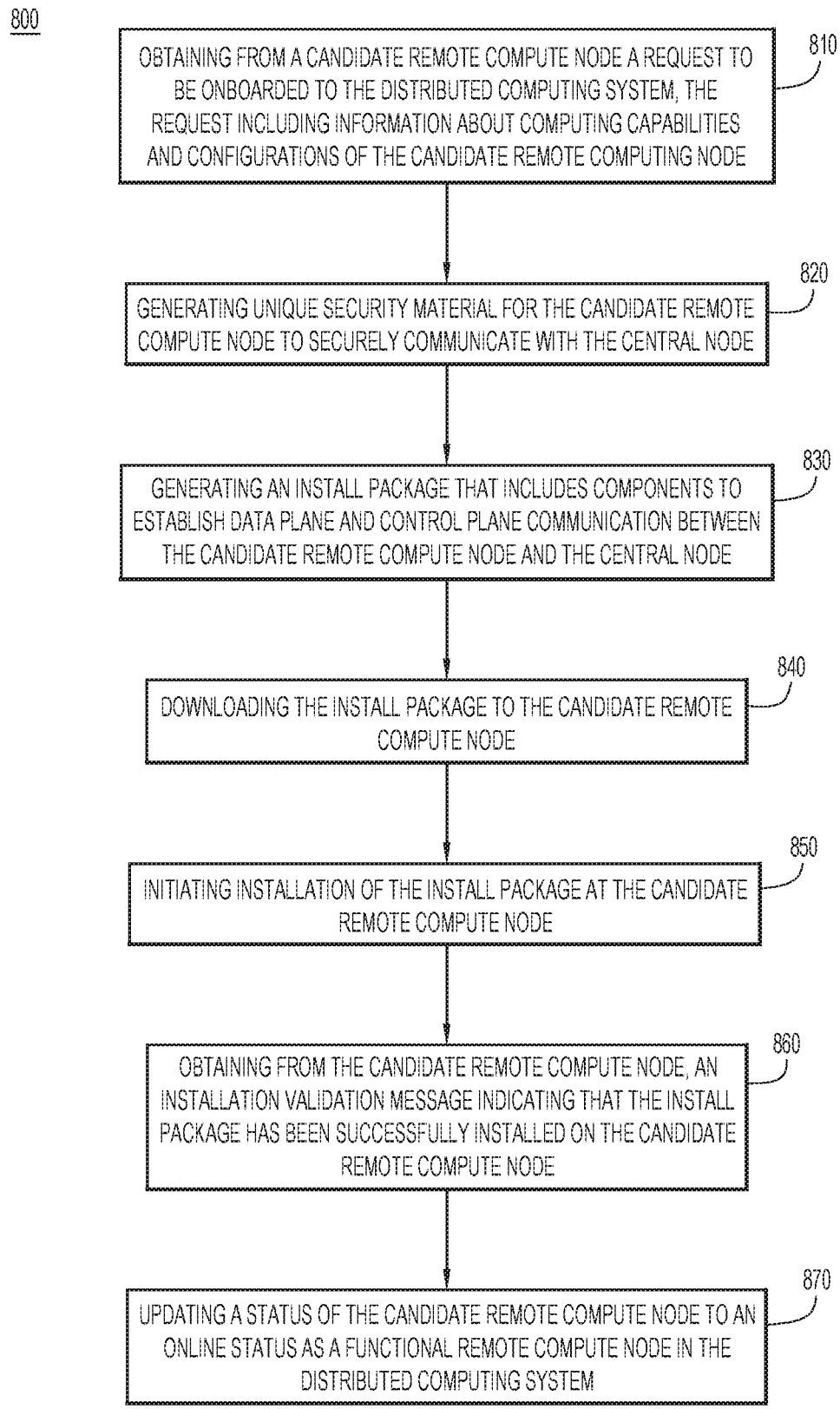
FIG. 10 is a flow chart of operations performed by the SDP central node in onboarding an SDP remote node, according to an example embodiment.

Reference is now made to FIG. 10. FIG. 10 shows a flow chart of a process 800 performed by a central compute node in a distributed computing system that includes a plurality of remote compute nodes whose computing resources and software functions are made available in a platform agnostic manner to users of the distributed computing system. At 810, the central node obtains (receives) from a candidate remote compute node a request to be onboarded to the distributed computing system, the request including information about computing capabilities and configurations of the candidate remote computing node. At 820, the central node generates unique security material for the candidate remote compute node to securely communicate with the central node. The unique security material may include encryption keys and a certificate associated with an identifier of the candidate remote compute node. The central compute node may add the identifier to an access control list for mapping to requests from the candidate remote compute node. In another form, the unique security material comprises a configuration of an open virtualization appliance (OVA)) image residing on the candidate remote compute node with onboarding components, security keys and a certificate to enable the candidate remote compute node to communicate with the central compute node. At 830, the central compute node generates an install package that includes components to establish data plane and control plane communications between the candidate remote compute node and the central compute node. The install package may include information pertaining to one or more of: data and control planes for streaming data between the candidate remote compute node and the central compute node. The install package may further include information pertaining to: secure (two-way) communication with the central node, life-cycle-management capabilities for microservices, health-monitoring and logging capabilities, and installation and orchestration of microservices. At

840, the central compute node downloads the install package to the candidate remote compute node. At 850, the central compute node initiates installation of the install package at the candidate remote compute node. At 860, the central compute node obtains (receives) from the candidate remote compute node, an installation validation message indicating that the install package has been successfully installed on the candidate remote compute node. At 870, the central compute node updates a status of the candidate remote compute node to an online status as a functional remote compute node in the distributed computing system.

Figure 11:
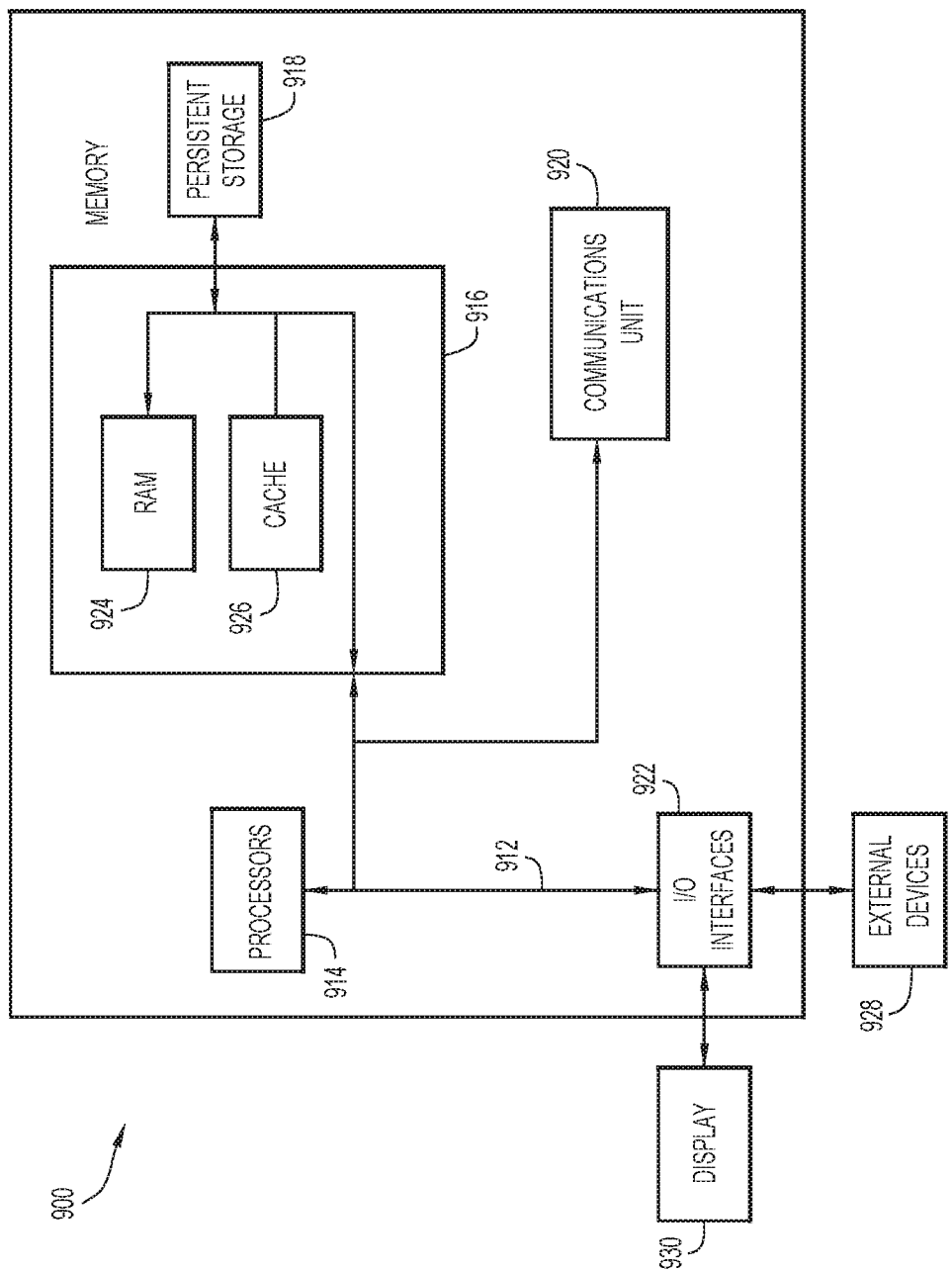
FIG. 11 is a hardware block diagram of an SDP remote node (or SDP central node) according to an example embodiment.

FIG. 11 is a block diagram depicting components of a computing or networking entity/device 900 that may be a central computing node 110 or remote computing node 115(1)-115(N). It should be appreciated that FIG. 11 provides only an illustration of one embodiment and does not imply any limitations with regard to the environments in which different embodiments may be implemented. Many modifications to the depicted environment may be made.

As depicted, the device 900 includes a bus 912, which provides communications between computer processor(s) 914, memory 916, persistent storage 918, communications unit 920, and input/output (I/O) interface(s) 922. Bus 912 can be implemented with any architecture designed for passing data and/or control information between processors (such as microprocessors, communications and network processors, etc.), system memory, peripheral devices, and any other hardware components within a system. For example, bus 912 can be implemented with one or more buses.

Memory 916 and persistent storage 918 are computer (processor) readable storage media. Memory 916 may include random access memory (RAM) 924 and cache memory 926. In general, memory 916 can include any suitable volatile or non-volatile computer readable storage media.

One or more programs may be stored in persistent storage 918 for execution by one or more of the respective computer processors 914 via one or more memories of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications unit 920, in these examples, provides for communications with other data processing systems or devices. In these examples, communications unit 920 may include one or more network interface cards. Communications unit 920 may provide communications through the use of either or both physical and wireless communications links.

I/O interface(s) 922 allows for input and output of data with other devices that may be connected to apparatus 900. For example, I/O interface 922 may provide a connection to external devices 928 such as a keyboard, keypad, a touch screen, and/or some other suitable input device. External devices 928 can also include portable computer readable storage media such as, for example, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. Display 930 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Smart-Phone, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., wired or wireless local area network (LAN), wired or wireless wide area network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided that is performed at a central compute node in a distributed computing system that includes a plurality of remote compute nodes whose computing resources and software functions are made available in a platform agnostic manner to users of the distributed computing system, the method comprising: obtaining from a candidate remote compute node a request to be onboarded to the distributed computing system, the request including information about computing capabilities and configurations of the candidate remote computing node; generating unique security material for the candidate remote compute node to securely communicate with the central compute node; generating an install package that includes components to establish data plane and control plane communications between the candidate remote compute node and the central compute node; downloading the install package to the candidate remote compute node; initiating installation of the install package at the candidate remote compute node; obtaining from the candidate remote compute node, an installation validation message indicating that the install package has been successfully installed on the candidate remote compute node; and updating a status of the candidate remote compute node to an online status as a functional remote compute node in the distributed computing system.

The unique security material may include encryption keys and a certificate associated with an identifier of the candidate remote compute node. In that case, the method may further include adding the identifier to an access control list for mapping to requests from the candidate remote compute node.

The operation of generating the unique security material may include configuring an open virtualization appliance (OVA) image residing on the candidate remote compute node with onboarding components, security keys and a certificate to enable the candidate remote compute node to communicate with the central compute node.

In one form, the install package may include information pertaining to one or more of: data and control planes for streaming data between the candidate remote compute node and the central compute node. The install package may further include information pertaining to: secure two-way communication with the central compute node, life-cycle-management capabilities for microservices, and installation and orchestration of microservices.

Furthermore, it should be understood that aforementioned operations of obtaining the request, generating unique security material, generating an install package, downloading the install package, initiating installation, obtaining the installation validation message and updating the status are performed for each of a plurality of candidate remote compute nodes to enable each of the plurality of candidate remote compute nodes to be a functional part of the distributed computing system.

In another form, an apparatus is provided comprising a communication interface configured to enable network communications; a memory configured to store instructions to be executed for performing one or more operations; and at least one processor coupled to the communication interface and the memory, wherein the processor is configured to execute the instructions to perform operations on behalf of a central compute node in a distributed computing system that includes a plurality of remote compute nodes whose computing resources and software functions are made available in a platform agnostic manner to users of the distributed computing system, the operations including: obtaining from a candidate remote compute node a request to be onboarded to the distributed computing system, the request including information about computing capabilities and configurations of the candidate remote computing node; generating unique security material for the candidate remote compute to securely communicate with the central compute node; generating an install package that includes components to establish data plane and control plane communications between the candidate remote compute node and the central compute node; downloading the install package to the candidate remote compute node; initiating installation of the install package at the candidate remote compute node; obtaining from the candidate remote compute node, an installation validation message indicating that the install package has been successfully installed on the candidate remote compute node; and updating a status of the candidate remote compute node to an online status as a functional remote compute node in the distributed computing system.

In still another form, one or more non-transitory computer readable storage media are provided, encoded with software comprising computer executable instructions and when the software is executed at a central compute node in a distributed computing system that includes a plurality of remote compute nodes whose computing resources and software functions are made available in a platform agnostic manner to users of the distributed computing system, the central compute node is operable to perform operations including: obtaining from a candidate remote compute node a request to be onboarded to the distributed computing system, the request including information about computing capabilities and configurations of the candidate remote computing node; generating unique security material for the candidate remote compute node to securely communicate with the central compute node; generating an install package that includes components to establish data plane and control plane communications between the candidate remote compute node and the central compute node; downloading the install package to the candidate remote compute node; initiating installation of the install package at the candidate remote compute node; obtaining from the candidate remote compute node, an installation validation message indicating that the install package has been successfully installed on the candidate remote compute node; and updating a status of the candidate remote compute node to an online status as a functional remote compute node in the distributed computing system.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed at a central compute node in a distributed computing system that includes a plurality of remote compute nodes whose computing resources and software functions are made available in a platform agnostic platform agnostic manner to users of the distributed computing system, the method comprising:
   obtaining from a candidate remote compute node a request to be onboarded to the distributed computing system, the request including information about computing capabilities and configurations of the candidate remote compute node;
   generating unique security material for the candidate remote compute node to securely communicate with the central compute node;
   generating an install package that includes components to establish data plane and control plane communications between the candidate remote compute node and the central compute node;
   downloading the install package to the candidate remote compute node;
   initiating installation of the install package at the candidate remote compute node;
   obtaining from the candidate remote compute node, an installation validation message indicating that the install package has been successfully installed on the candidate remote compute node; and
   updating a status of the candidate remote compute node to an online status as a functional remote compute node in the distributed computing system.

2. The method of claim 1, wherein the unique security material includes one or more encryption keys and a certificate associated with an identifier of the candidate remote compute node.

3. The method of claim 2, and further comprising adding the identifier to an access control list for mapping to requests from the candidate remote compute node.

4. The method of claim 1, wherein generating unique security material comprises configuring an open virtualization appliance (OVA) image residing on the candidate remote compute node with on-boarding components, security keys and a certificate to enable the candidate remote compute node to communicate with the central compute node.

5. The method of claim 1, wherein the install package includes information pertaining to one or more of: data and control planes for streaming data between the candidate remote compute node and the central compute node.

6. The method of claim 5, wherein the install package further includes information pertaining to: secure two-way communication with the central compute node, life-cycle-management capabilities for microservices, and installation and orchestration of microservices.

7. The method of claim 1, wherein obtaining the request, generating unique security material, generating an install package, downloading the install package, initiating installation, obtaining the installation validation message and updating the status are performed for each of a plurality of candidate remote compute nodes to enable each of the plurality of candidate remote compute nodes to be a functional part of the distributed computing system.

8. An apparatus comprising:
   a communication interface configured to enable network communications;
   a memory configured to store instructions to be executed for performing one or more operations; and
   at least one processor coupled to the communication interface and the memory, wherein the processor is configured to execute the instructions to perform operations on behalf of a central compute node in a distributed computing system that includes a plurality of remote compute nodes whose computing resources and software functions are made available in a platform agnostic manner to users of the distributed computing system, the operations including:
      obtaining from a candidate remote compute node a request to be onboarded to the distributed computing system, the request including information about computing capabilities and configurations of the candidate remote compute node;
      generating unique security material for the candidate remote compute node to securely communicate with the central compute node;
      generating an install package that includes components to establish data plane and control plane communications between the candidate remote compute node and the central compute node;
      downloading the install package to the candidate remote compute node;
      initiating installation of the install package at the candidate remote compute node;
      obtaining from the candidate remote compute node, an installation validation message indicating that the install package has been successfully installed on the candidate remote compute node; and
      updating a status of the candidate remote compute node to an online status as a functional remote compute node in the distributed computing system.

9. The apparatus of claim 8, wherein the unique security material includes one or more encryption keys and a certificate associated with an identifier of the candidate remote compute node.

10. The apparatus of claim 9, wherein the operations further include adding the identifier to an access control list for mapping to requests from the candidate remote compute node.

11. The apparatus of claim 8, wherein the processor is configured to generate unique security material by configuring an open virtualization appliance (OVA) image residing on the candidate remote compute node with onboarding components, security keys and a certificate to enable the candidate remote compute node to communicate with the central compute node.

12. The apparatus of claim 8, wherein the install package includes information pertaining to one or more of: data and control planes for streaming data between the candidate remote compute node and the central compute node.

13. The apparatus of claim 12, wherein the install package further includes information pertaining to: secure two-way communication with the central compute node, life-cycle-management capabilities for microservices, and installation and orchestration of microservices.

14. One or more non-transitory computer readable storage media encoded with software comprising computer executable instructions and when the software is executed at a central compute node in a distributed computing system that includes a plurality of remote compute nodes whose computing resources and software functions are made available in a platform agnostic manner to users of the distributed computing system, the central compute node is operable to perform operations including:

obtaining from a candidate remote compute node a request to be onboarded to the distributed computing system, the request including information about computing capabilities and configurations of the candidate remote compute node;

generating unique security material for the candidate remote compute node to securely communicate with the central compute node;

generating an install package that includes components to establish data plane and control plane communications between the candidate remote compute node and the central compute node;

downloading the install package to the candidate remote compute node;

initiating installation of the install package at the candidate remote compute node;

obtaining from the candidate remote compute node, an installation validation message indicating that the install package has been successfully installed on the candidate remote compute node; and updating a status of the candidate remote compute node to an online status as a functional remote compute node in the distributed computing system.

15. The non-transitory computer readable storage media of claim 14, wherein the unique security material includes one or more encryption keys and a certificate associated with an identifier of the candidate remote compute node.

16. The non-transitory computer readable storage media of claim 15, wherein the operations further include adding the identifier to an access control list for mapping to requests from the candidate remote compute node.

17. The non-transitory computer readable storage media of claim 14, wherein generating unique security material comprises configuring an open virtualization appliance (OVA) image residing on the candidate remote compute node with on-boarding components, security keys and a certificate to enable the candidate remote compute node to communicate with the central compute node.

18. The non-transitory computer readable storage media of claim 14, wherein the install package includes information pertaining to one or more of: data and control planes for streaming data between the candidate remote compute node and the central compute node.

19. The non-transitory computer readable storage media of claim 18, wherein the install package further includes information pertaining to: secure two-way communication with the central compute node, life-cycle-management capabilities for microservices, and installation and orchestration of microservices.

20. The non-transitory computer readable storage media of claim 14, wherein obtaining the request, generating unique security material, generating an install package, downloading the install package, initiating installation, obtaining the installation validation message and updating the status are performed for each of a plurality of candidate remote compute nodes to enable each of the plurality of candidate remote compute nodes to be a functional part of the distributed computing system.

* * * * *